United States Patent [19]
Smith, Jr.

[11] Patent Number: 5,895,048
[45] Date of Patent: Apr. 20, 1999

[54] COMBINATION CARDS FOR LEARNING AND PRACTICING BLACKJACK AND BLACKJACK STRATEGY SYSTEMS

[76] Inventor: Alfred J. Smith, Jr., 4901 Gulf Shore Blvd., Naples, Fla. 34103

[21] Appl. No.: 08/943,309

[22] Filed: Oct. 14, 1997

[51] Int. Cl.$^6$ .............................. A63F 1/00; G09B 19/22
[52] U.S. Cl. ................ 273/293; 434/129; 273/307
[58] Field of Search ........................... 273/292, 293, 273/302, 307, 274, 249; 434/129

[56] References Cited

U.S. PATENT DOCUMENTS

| | | | |
|---|---|---|---|
| 4,014,549 | 3/1977 | Cywar | 273/304 |
| 4,497,490 | 2/1985 | Rogers, Jr. | 273/249 |
| 4,591,162 | 5/1986 | Fakhoury | 273/303 |
| 5,100,326 | 3/1992 | Leep et al. | 434/129 |
| 5,280,916 | 1/1994 | Gleason, Jr. | 273/304 |

Primary Examiner—Benjamin H. Layno
Attorney, Agent, or Firm—Robin, Blecker & Daley

[57] ABSTRACT

Specially made combination cards for learning and practicing the optimal decisions which arise in the game of blackjack as played in casinos. The face of each card is an overlapping combination of cards found in a standard deck of playing cards. They are presented so as to resemble the way they look to the player when dealt with both initial cards dealt face down or face up. A first card portion (11) appears at the upper left-most edge. A second card portion (12) appears to overlap the first one. Each of the composite cards has the same combination in separate sections (10 and 10) presented in opposing orientations so that they can be readily read in either direction. The back of each card is either blank or patterned similarly to those used in casinos. No information about the front of the card can be deduced or inferred from the back of the card. Each combination card represents a situation in which the optimal way to play the hand varies according to which playing strategy the player uses, the number of cards played and the number of cards yet to be dealt, the composition of the cards yet to be dealt and the rules of the casino and/or its governing authority.

20 Claims, 5 Drawing Sheets

COMBO CARDS IN THE PRACTICE DECK

| | | |
|---|---|---|
| Ace – Two | Five – Five | Three – Seven | Nine – Four |
| Ace – Three | Six – Six | Four – Six | Ten/Face – Three |
| Ace – Four | Seven – Seven | Two – Nine | Eight – Six |
| Ace – Five | Eight – Eight | Three – Eight | Nine – Five |
| Ace – Six | Nine – Nine | Four – Seven | Ten/Face – Four |
| Ace – Seven | Ten – Ten | Five – Six | Ten/Face – Five |
| Ace – Eight | Two – Six | Seven – Five | Nine – Six |
| Ace – Nine | Three – Five | Eight – Four | Eight – Seven |
| Ace – Ace | Two – Seven | Nine – Three | Nine – Seven |
| Two – Two | Three – Six | Ten/Face – Two | Ten/Face – Six |
| Three – Three | Four – Five | Seven – Six | Two-Five-Ace |
| Four – Four | Two – Eight | Eight – Five | |

FIG. 6

COMPARISON OF 2-CARD HAND FREQUENCIES

| Total Occurances | Standard Deck | MKE Practice Deck | MKE Deck Subset | | Standard Deck Formulas | Row# |
|---|---|---|---|---|---|---|
| Cards in the Deck | 52 | 46 | 26 | | | 27 |
| 2-Card Hands | 2652 | 46 | 26 | | R27*(R27-1) | 28 |
| No Decision Combos | 1728 | 0 | 0 | | R28-R30 | 29 |
| 2-Card Decisions | 924 | 46 | 26 | | SUM(R43..R54) | 30 |
| | | | | | | 31 |
| Practice Effectivness Factor: | | 20 | 36 | | R30/MKE30,S30 | 33 |
| % Practice Time viz Std. Deck | | 5.0% | 2.8% | | MKE30,S30/R30 | 36 |
| | | | | | | 39 |

| 2-Card Combo Frequency | Standard Deck | MKE Practice Deck | MKE Deck Subset* | | Standard Deck Formulas | Row# |
|---|---|---|---|---|---|---|
| 11 | 64  2.4% | 4  8.7% | 1  3.8% | | 4*4*4 R43/R28 | 43 |
| 10 (not 5-5) | 48  1.8% | 3  6.5% | 1  3.8% | | 4*4*4 R44/R28 | 44 |
| 9 | 48  1.8% | 3  6.5% | 1  3.8% | | 4*4*4 R45/R28 | 45 |
| 8 (not4-4) | 32  1.2% | 2  4.3% | 1  3.8% | | 4*4*4 R46/R28 | 46 |
| Ace + 2 thru 9 | 128  4.8% | 8  17.4% | 8  30.8% | | 4*4*4 R47/R28 | 47 |
| Pairs, Ace thru 9 | 108  4.1% | 9  19.6% | 9  34.6% | | 4*4*4 R48/R28 | 48 |
| Pairs, 10 Cards** | 240  9.0% | 1  2.2% | 1  3.8% | | 4*4*4 R49/R28 | 49 |
| Hard 12 (not 6-6) | 64  2.4% | 4  8.7% | 1  3.8% | | 4*4*4 R50/R28 | 50 |
| Hard 13 | 64  2.4% | 4  8.7% | 1  3.8% | | 4*4*4 R51/R28 | 51 |
| Hard 14 (not 7-7) | 48  1.8% | 3  6.5% | 1  3.8% | | 4*4*4 R52/R28 | 52 |
| Hard 15 | 48  1.8% | 3  6.5% | 1  3.8% | | 4*4*4 R53/R28 | 53 |
| Hard 16(not 8-8) | 32  1.2% | 2  4.3% | 1  3.8% | | 4*4*4 R54/R28 | 54 |

* Uses only one combination for each 2-card total.  ** When both cards are any Ten thru King, they can be split as 2 Tens in almost all casinos.

FIG. 7

COMBINATION CARDS FOR LEARNING AND PRACTICING BLACKJACK AND BLACKJACK STRATEGY SYSTEMS

BACKGROUND

1. Field of the Invention

This invention relates to learning and practicing how to play the game of blackjack in a casino so as to optimize one's opportunity to win under any set of rules and strategies.

2. Discussion of Prior Art

Previous inventions in this field have been based on the flash card model in which a situation is presented on one side of a card with the recommended action presented on the other.

The printing on flash cards is usually unidirectional, that is, the cards must be oriented right-side up to be read correctly. Therefore, when stacked and shuffled, not only must they all be facing up, but in addition, their orientations must be consistent so that as each card is viewed and discarded, the next one is able to be viewed in a similar orientation. This restriction means that care must be taken when shuffling or otherwise mixing unidirectional cards to keep them oriented correctly. Such unidirectional cards sometimes have a unique mark or physical anomaly which facilitates proper orientation when stacking, such as a single notched or flattened corner.

There are card devices which do not have the unidirectional nature of the cards described above. A common example is standard playing cards used to play bridge, poker or blackjack. The card faces are essentially the same when viewed right-side up or upside down, because the symbols and numbers on the faces are arranged symmetrically about a line drawn across the card from one side to the other. The nondirectional nature of playing cards facilitates shuffling of the cards because the orientation of the cards with respect to one another is not a factor, as long as they are stacked all facing the same direction.

Flash cards present a useful way to learn a particular strategy for playing blackjack under a particular set of rules, and have been produced heretofore.

In his book Million Dollar Blackjack (1981), page 124b, Ken Uston presented a set of flash cards for learning how to play blackjack. These cards have subsequently been produced as a stand alone product. The flash cards are about 4 cm square and are printed on the front only. They have numbers and letters in large print representing the playing cards belonging to the player and the dealer. The "answer" is a number in small print in the corner of the card. The player must learn the numbers corresponding to each combination of playing cards, and he uses this knowledge in optimizing his playing of the game. These flash cards have at least two deficiencies. First, they are unidirectional in nature, and therefore very inconvenient to shuffle. Moreover, the numbers and letters in large print are only representations of the values of the player's or dealer's cards. They do not depict the cards as they actually appear when held in the hand. The user must translate what the numbers or letters show into a visualization of the playing situation. This process of translation causes a delay in the learning process, and does not accurately simulate the playing situation.

Another blackjack flash card product is Flash Jack, initially manufactured by V. R. Clavel (1986). Flash Jack comprises a deck of cards which describe the playing situation in words on the front and which have the answers in words on the back. There is no pictorial representation whatsoever of the playing situation, and the cards are unidirectional. The information presented is overly complex and requires significant time and thought to assimilate.

Another blackjack flash card product is a "Free Learning Kit" of flash cards included in John Sharpe's book Low Stakes Blackjack (1994), pages 31–45. Each card is about 2-¼"×4" with six 2-card hands and a dealer's card depicted on the face. Each depiction is about ⅜"×½" with a number in the middle. On the back is Sharpe's one recommended action for each hand with page references for why it is recommended. The cards are unidirectional and suffer from bearing no resemblance to the playing conditions of a casino.

U.S. Pat. No. 4,014,549 to Cywar (1977) discloses a blackjack card deck. Each card has a number and suit printed in the corner to simulate one of the player's cards (Patent FIGS. 1–13). The card has a chart summarizing the action a player should take depending on what other cards are present. The chart has the player's cards and the dealer's cards along its two axes. The cards are unidirectional, and therefore inconvenient to shuffle. Though the symbols in the corners of each card simulate the printing on a playing card, they do not substantially depict any actual playing card situation. The information presented on the card in chart form is relatively complex and difficult to interpret compared to similar charts portrayed in current blackjack literature.

U.S. Pat. No. 5,100,326 to Leep, et al. (1992) discloses a pack of flash cards for teaching and practicing blackjack. The face of each card contains two playing situations on opposite ends of the card arranged so that each appears either right side up or upside down regardless of which end is up. Each half also contains within a frame a smaller perspective image of a card and a still smaller oblong box containing an identifier for a method of grouping subsets of the total deck. The back of each card also presents two separate sections which provide a recommended action for the situation represented on the same half of the card's face. (Patent FIGS. 1–4).

The prior art has not addressed the issue that the optimal way to play most hands varies for different casino rules and for different strategies. They are designed to present one set of playing options in any one embodiment of the design. However, to maximize the opportunities to win at blackjack, a player must know what play to make for each combination of dealer and player cards under different playing rules and regulations. Proper play for some situations can be described in words as a set of rules, such as "Always stand when you have a hard total of nineteen.", "Always take a card when you have a hard total of 11 or less.", "Always take a card when you have a soft total of 17.", Always split a pair of aces.". However, for many situations—particularly those which offer the player the opportunity to increase his bet by as much as double, the optimal play depends on the number of decks being used, the number of cards yet to be dealt, the composition (values) of the cards not yet dealt, and the casino and regulatory rules governing both the dealer's and the players' options.

There are many sources of information for making optimal decisions and for devising one's own. Edward O. Thorp "Beat The Dealer" (1962, 1966) presented the first system for counting cards to guide both betting and playing strategy ascribing from 1 to 10 points for each different card denomination. Julian Braun's "How To Play Winning Blackjack" (1980) derives a "basic strategy" from running several billion hands through a computer and making detailed probability calculations from the results. Peter A. Griffin "The Theory of Blackjack" (1979, 1981) developed mathematical models for determining the player's advantage or disadvantage. Stanford Wong "Professional Blackjack" (1975, 1994) and others (e.g., Ian Anderson, Bryce Carlson, Lawrence Revers, Arnold Snyder, Michael Dalton, J. Paterson) develop simplified plus and minus counting systems which indicate for each hand dealt both the preferred bet size or betting option and how to best play the hand.

While the flash cards disclosed in prior art could be presented in sets with each set showing a preferred way to play for each combination of house and/or regulatory rules, it would mean having at least twelve sets for each strategy recommendation: 6 for when the Dealer is dealt one card face up and one face down and 6 for when the Dealer is dealt both cards face up. 1) Dealer stands on soft seventeen; 2) Dealer hits soft seventeen; 3) Doubling down after splitting a pair; 4) no doubling down after splitting a pair; 5) lose all, except a player two card blackjack, to a dealer's blackjack; 6) doubling and splitting bets returned if the dealer has blackjack. In the popular literature available where gaming books are sold one can find at least four counting systems in addition to each author's presentation of "basic strategy".

However, even if the sixty or more sets of flash cards inferred from the prior art were available to choose from, they do not permit the practice session to resemble the way the cards appear in a casino setting.

Learning to play can be facilitated by the use of a special deck of combination cards. Although 2,652 two-card combinations are possible with one deck of cards, only 1,164 (44%) offer options to the player. For those that do offer playing and betting options it is advantageous to practice them in random order as they would appear during a game in a casino. Since the optimal play varies with both the rules governing play, the dealer's exposed card(s), the number of cards yet to be played and their values, the combination cards used for learning and practicing should not present recommendations that are only optimal for one matrix of conditions.

In summary, cards heretofore known for practicing of blackjack suffer from a number of disadvantages:

(a) The flash cards do not portray a true-to-life depiction of the player's cards as the player would see them when playing at a casino. Instead, plain numbers or letters are used to represent the values of the visible cards. Where pictorial combinations are provided, the cards do not resemble the way the cards faces look to a player in that they have additional graphics and text.

(b) They are flash cards with a situation presented on one side and the provider's recommended action on the other. This prevents the player from simulating actual playing conditions while practicing.

(c) They either assume, erroneously, that there is one preferred method for playing the hands depicted or that the user will need to have a separate set for the particular circumstances at each casino at which he may want to play.

(d) Flash cards cannot be assembled into a deck and dealt out randomly face down so that the player does not know what combination is presented as the backs indicate the combination on the face and present the play the author deems best for one particular set of casino rules and regulations.

(e) Those that are unidirectional in nature, prevent easy shuffling as is possible with a standard deck of playing cards.

(f) The information on the cards is frequently complex. Complexity deters the user from practicing under simulated casino conditions.

(g) There exists no simple means for accurately representing the multiple card combinations in the player's hand as they would appear to him in a casino game setting.

(h) The additional information on the back of the cards provide clues or guides to the situation depicted. Since the backs of casino cards reveal nothing about the faces, this impedes the transition from practice to casino play.

OBJECTS AND ADVANTAGES

Accordingly, several objects and advantages of the present invention are as follows:

(a) to provide a method of pictorial representation of combinations of playing cards on cards which will facilitate and expedite the comprehension of card combination situations in the game of blackjack;

(b) to provide a method of pictorial representation of playing cards which will present a more accurate simulation of the activity of playing the game of blackjack than provided by the current art;

(c) to provide a method of pictorial representation of playing cards which permit the identification of the proper play according to whichever strategy the user opts for and to permit the same set of combination cards to be used for other strategy choices when and if the user wants to use another;

(d) to provide a method of arranging information on cards which will enable ease of shuffling of the cards;

(e) to provide a set of cards having the 47 combinations out of a possible 2,652 in which the optimal play varies according to the playing rules promulgated by the governing authority and/or those established by the casino—which can vary from table to table; the cards in play and the cards yet to be played before the dealer reshuffles.

SUMMARY OF THE INVENTION

In accordance with the principles of the present invention, the above and other objects are realized in a deck of cards for practicing blackjack, the deck of cards including a number of combination cards, each combination card having a representation of a playing situation printed on the front side of the card comprised of a plurality of image portions of playing cards, arranged to look like cards dealt to a player, so as to simulate the way at least a plurality of cards look when dealt to a player in a casino. Preferably, the back of each card combination also simulates the look of a card when dealt to a player at a casino. Also, preferably the back and front of each combination card is devoid of other information concerning the playing situation depicted on the front of the card.

Each combination card can be of the same size and kind as is found in a normal deck of playing cards as used in a casino and each card can have a back of the same design so that there is no indication of what is on the face of the card. The portions of the playing cards on the face of the combination card can depict two or more cards overlapped and positioned so as to closely simulate the way the cards appear when dealt to a player in a casino game of blackjack. Thus, the combination cards simulate the playing situation in a casino either in the way they appear when both cards are dealt face down and the player picks them up to see what they are or in the way they are dealt in casinos which deal the cards face up and the players do not touch the cards.

DESCRIPTION OF DRAWINGS

The above and other features and aspects of the present invention will become apparent upon reading the following detailed description in conjunction with the accompanying drawings in which:

FIG. 6 is a list of the combination cards in a full practice deck in accordance with the principles of the invention; and FIG. 7 shows a table summarizing the 2-card breakdowns of a standard deck of playing cards as compared to a deck of playing cards and a subset thereof in accordance with the invention.

LIST OF REFERENCE NUMERALS

Figure 2:
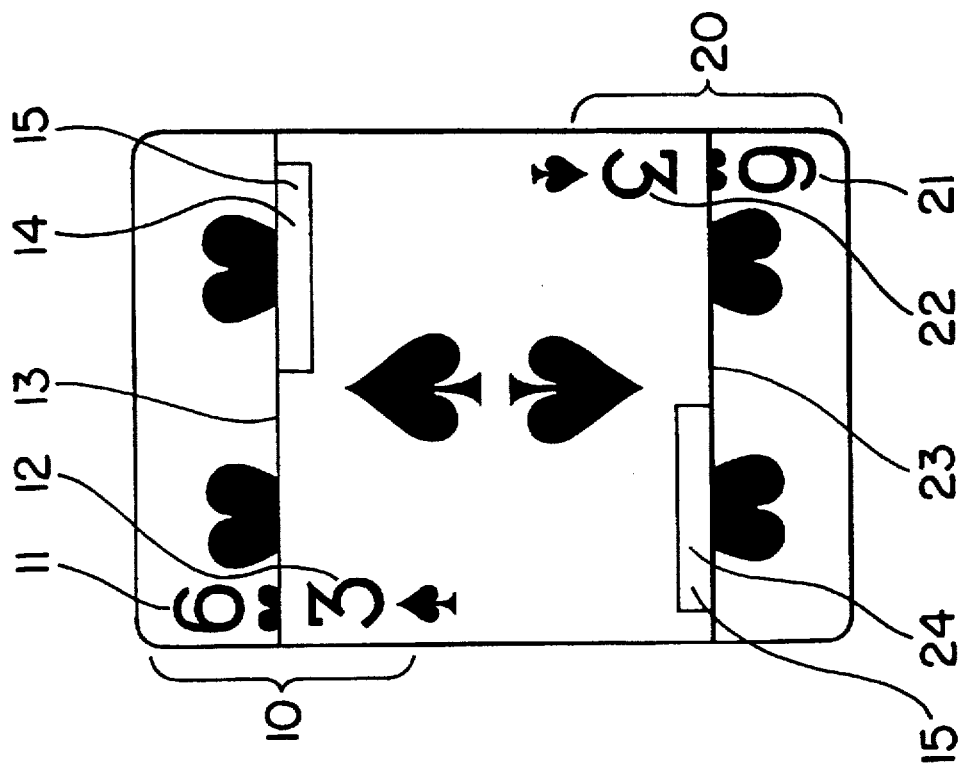
FIGS. 1 and 2 show two fronts of a combination card for practicing blackjack in accordance with the principles of the present invention.

10. Upper section of front of card
11. Revealed portion of player's first card
12. Revealed portion of player's second card
13. Line simulating of card portion
14. Region for producer's logo
15. Producer's logo
16. Revealed portion of player's third card
20. Lower section of front of card
21. Revealed portion of player's first card
22. Revealed portion of player's second card
23. Line simulating edge of card portion
24. Region for producer's logo

DETAILED DESCRIPTION OF THE INVENTION

Figure 1:
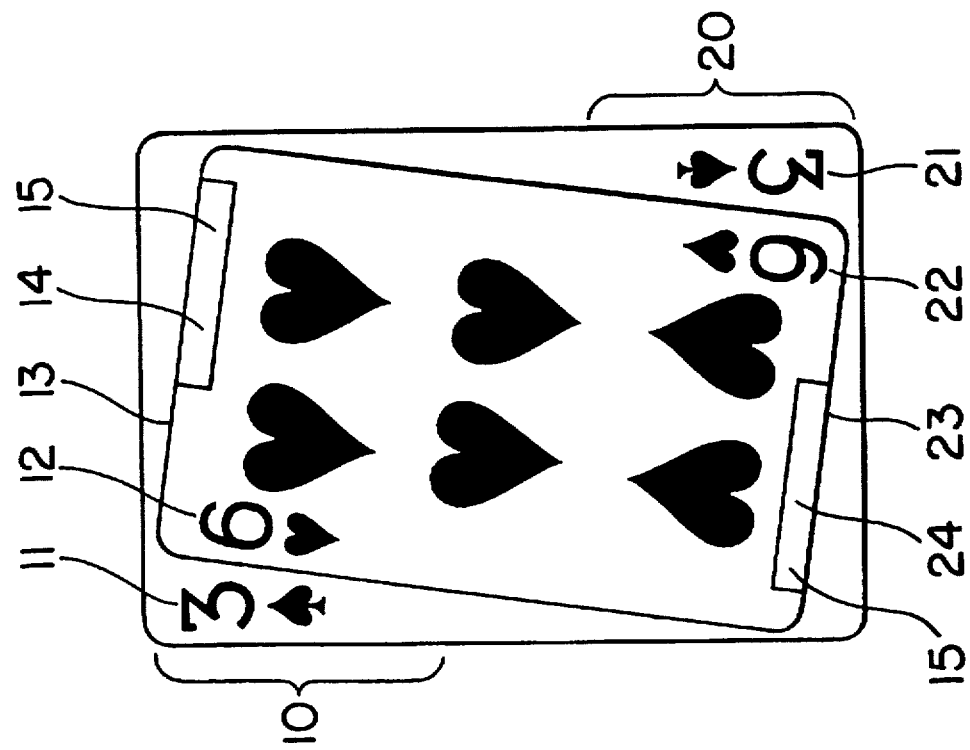

Typical embodiments of the present invention are the combination cards illustrated in FIGS. 1–4. Each card shown is one of a set of cards intended to be used for the practice of making decisions in the game of blackjack. Each card is the size, shape and weight of a standard card used for playing card games in a casino. The front of each card, as illustrated in FIGS. 1 and 2, has two main sections 10 and 20 printed in opposing orientation, one at each end of the card. Each section portrays a player's blackjack hand consisting of two or three playing cards. Each end of the front of the combination card, therefore, displays a combination of cards which represents a combination of playing cards that could occur during the process of playing a game of blackjack in a casino.

The player's hand appears as overlapping images of portions of playing cards. A first card portion 11 appears at the upper edge or the upper left-most edge of the front of the card. A second card portion 12 appears to overlap the first one, partially obscuring it. A line 13 which simulates the edge of the second card portion separates the images of the playing cards. The two portions of playing cards thus simulate two playing cards held in a player's hand facing the player and spread so as to reveal the rank and suit pips in the corner of the cards.

Figure 5:
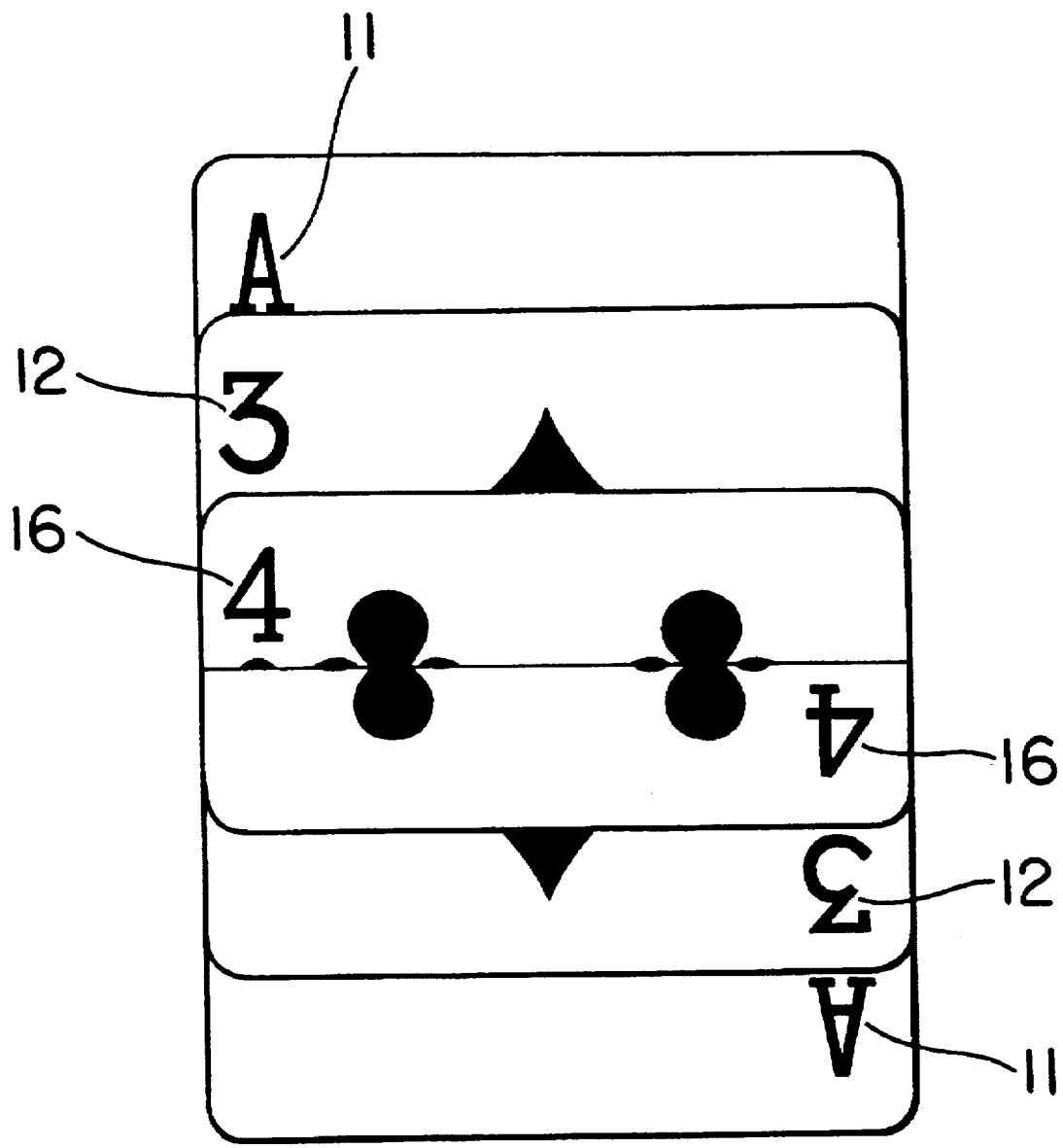
FIG. 5 shows a further front of a combination card in accordance with the principles of the present invention.

More than two players' cards can be depicted, as shown in the embodiment in FIG. 5. In this combination card, a third playing card 15 also appears, overlapping a second card 12 and a first card 11.

The front of the card also has a region 14 available for information unrelated to the operation of the card, such as a manufacturer's logo 15 or copyright.

Figure 4:
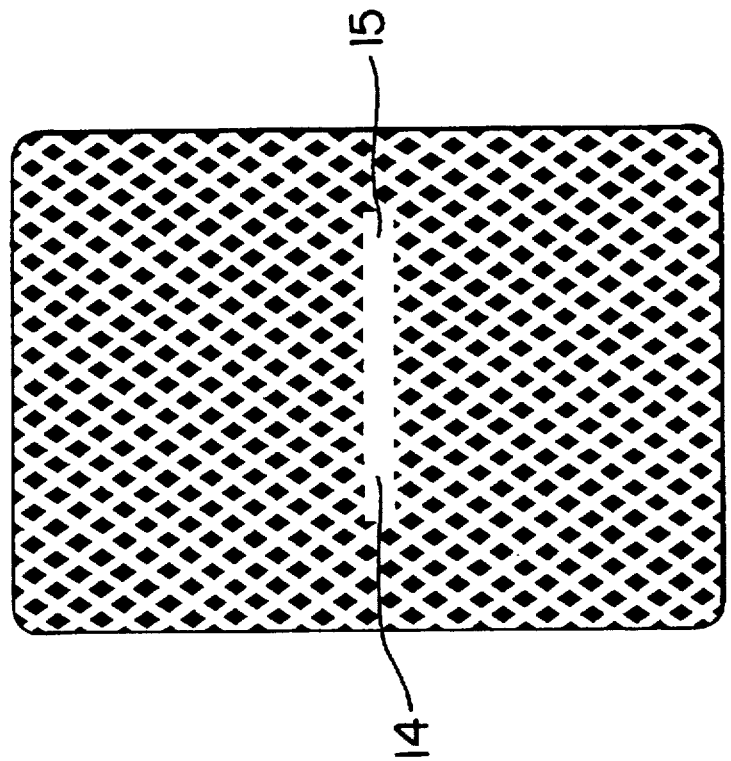
FIGS. 3 and 4 show the backs of a combination card for practicing blackjack in accordance with the principles of the present invention.
Figure 3:
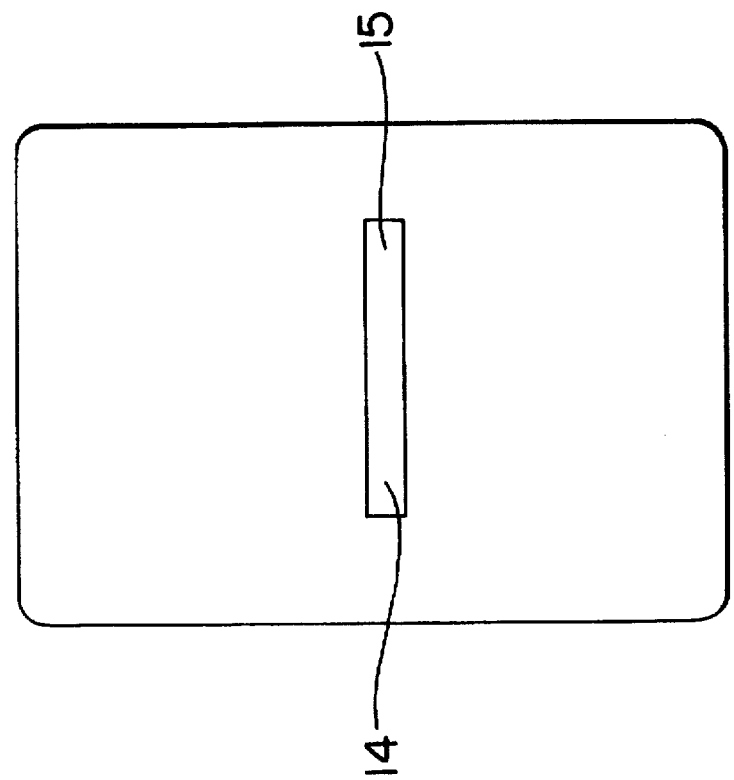

Although the illustrations do not denote color, the playing card images would be printed in the colors appropriate for their suits or ranks, such as red for hearts, black for spades, and multicolored for the royal design of face cards. The back of the card, as illustrated in the embodiments in FIGS. 3 and 4 is either blank or has a design consistent with those used on the backs of playing cards in casinos. Like the front of the combination card, the back has enough additional area to print a manufacturer's logo 14. Nothing on the back of the card would indicate which combo is on the front, nor would the back or the front contain any information as to the operation of the card.

A set of cards includes 47 combination cards. These represent all of the two card combinations and unique three card combinations in which the optimal play depends on the strategy the player is using. A listing of these is provided in FIG. 6. A 27 card subset comprised of one combination card for each decision total can be used where the various 2 card totals are not relevant to the strategy being learned. Strategy tables have been developed for making choices based on the different values of the two cards which can add up to a decision total. An example of one such is Table 1, page 256, Professional Blackjack, by Stanford Wong.

FIG. 7 provides comparisons of practicing blackjack using a standard deck of playing cards with the 47 card deck in accordance with the present invention (referred to in FIG. 7 as the "MKE Practice Deck") and with the sub-set 27 card deck (referred to in FIG. 7 as the "MKE Deck Subset"). As above-noted, the sub-set deck uses only one combo for each decision total in the full MKE Practice Deck.

In FIG. 7, only the 2 card hand frequencies are considered so that this excludes the three card combination card (Two-Five-Ace) from the deck as set forth in FIG. 6. Accordingly, this accounts for the MKE Practice Deck and subset deck being listed in FIG. 6 as having 46 and 26 cards, respectively.

A standard deck of cards has 2,652 possible two-card combinations. Of these, only 924 represent hands in which the player has a decision to make—all the others being covered by generalized rules. Because the MKE Practice Deck contains only those hands which can require a decision depending on the rules in force and the cards played and yet to be played, the time required for any degree of mastery is reduced to just 5% of the time it would take if a standard deck were shuffled and dealt out repeatedly. This can also be stated as increasing the value of the time spent practicing by a factor of 20.

FIG. 7 also shows that if the user's strategy ignores the different combinations that yield the same two-card totals, the practice time required compared to a standard deck is reduced to 2.8%. The practice efficiency is increased by a factor of 36.

Additionally, the player can set aside those two-card combos not yet mastered and focus just on them. This cannot be done at all with a standard deck. The MKE Practice Deck thus provides a dimension to the practice sessions which cannot be quantified. Each practice session can begin with shuffling the entire practice deck with the backs up; then turning up the combo cards one at a time. With any combo strategy not remembered, the card can be put face down in a separate pile and just these reviewed until locked in memory.

Operation of the Invention

The primary manner of using the present invention is self evident from inspection of the figures and reading of the description above. To use each card, the user looks at the front of the combination card which depicts a playing situation in the game of blackjack. The two or more cards portions 11 and 12 in FIGS. 1 and 2, visible in the upper half of the combination card comprise a player's hand. The user attempts to remember what action is best for each of the dealer's possible up cards. More than one combo card can be placed on a smooth surface face down and turned over one at a time. A variation is to have a group of regular playing cards one each from Ace to Ten to use to represent the dealer's up card. These are randomly mixed face down and one is turned up. The user then attempts to remember the proper play for this combination of dealer card and player hand(s).

In actual practice, the combination card is intended to be part of a product which is a deck of 54 cards. Forty-seven are cards of the design of the present invention as in FIGS. 1–5; three of the cards are printed with rules, instructions; one is a "basic" strategy table as shown in Braun's How To Play Winning Blackjack, page 24; three are blank strategy tables—using Braun's layout as above—so the user can put in the choices called for by the strategy he is learning. The size, shape and quantity of the cards is intended to resemble a regular deck of poker size playing cards.

Conclusions. Ramifications and Scope of the Invention

Accordingly, the reader will see that the combination cards of the present invention provide a more effective, more enjoyable, and easier to use method for practicing blackjack than has been supplied heretofore. The design of the printing on the cards dramatically increases the rate of comprehension of the situations and decisions being posed. It also more accurately simulates the playing of the game itself, and therefore the person practicing with the cards will be able more easily to move from the training tool to the actual game. The nondirectional nature of the cards enhances the ability of the cards to be shuffled, and increase the randomness of the mix created by shuffling. Furthermore, a proper embodiment of the features of the invention also provide additional advantages in that: (1) the number of cards needed to present the necessary information is reduced to an extent that the deck of cards is the same size and shape as a standard deck of poker sized playing cards. (2) A user could simply take a regular deck of playing cards and deal out blackjack hands to the same end. However, as FIG. 7 shows, of the 2,652 possible two-card combinations using one deck, only 924 are hands in which optimal play varies with the overall playing conditions and the cards in play and yet to be dealt. By focusing on this 35%, rather than dealing hands, overall learning multiples of over 2000% become available as summarized in FIG. 7. FIG. 7 also shows that the combinations which allow the player to increase his bet after the hand has been dealt occur approximately 16.1% of the time when randomly dealing a standard deck of cards and occur 63% in the MKE Practice Deck and 76% of the time in the sub-set shown (splitting pairs, other than 10s; soft totals; hard totals 8–11).

Although the description above contains many specificities, these should not be construed as limiting the scope of the invention but merely providing illustrations of some of the presently preferred embodiments of the invention. Thus, the scope of the invention should be determined by the appended claims and the legal equivalents rather than by the examples given.

What is claimed is:

1. A combination card for practicing the game of blackjack, with a representation of a playing situation depicted on the front side of said card comprised of a plurality of images of portions of playing cards, arranged to look like cards dealt to a player, so as to simulate the way at least a plurality of cards look when dealt to a player in a casino the image of each portion of a playing card includes at opposing parts of the combination card the same depiction of a class used in astandard deck of cards.

2. The combination card of claim 1 wherein:

the back of the card simulates the look of a card when dealt to a player in a casino.

3. The combination card of claim 2 wherein:

the back of the card is one of blank and has a design which emulates the look of the back of a playing card when dealt to a player at a casino.

4. The combination card of claim 3 wherein:

the front and back of the card are devoid of other information concerning the playing situation depicted by the plurality of images of portions of playing cards on the front of the card.

5. The combination card of claim 3 wherein:

the front and back of the card are devoid of instructional information regarding the playing of the game of blackjack.

6. The combination card of claim 1 wherein:

the front and back of the card are devoid of other information concerning the playing situation depicted by the plurality of images of portions of playing cards on the front of the card.

7. The combination card of claim 1 wherein:

the front and back of the card are devoid of instructional information regarding the playing of the game of blackjack.

8. The combination card of claim 1 wherein:

plurality of images comprise images of portions of two playing cards.

9. The combination card of claim 1 wherein:

the plurality of images comprise images of portions of three playing cards.

10. The combination card of claim 1 wherein:

the image of each portion of a playing card includes a depiction of a card class and suit used in a standard deck of cards.

11. The combination card of claim 10 wherein:

the image of each portion of a playing card includes at opposing parts of the combination card the same depiction of a suit used in a standard deck of cards.

12. The combination card of claim 11 wherein:

said card class is one of an Ace, King, Queen, Jack and the numbers from 2 through 10;

and said suit is one of a heart, club, diamond and spade.

13. The combination card of claim 12 wherein:

the color of said depiction is red if the suit is one of a heart and diamond;

the color of said depiction is black if the suit is one of a club and spade.

14. A deck of cards including a plurality of combination cards for practicing the game of blackjack, each combination card having a representation of a playing situation depicted on the front side of the combination card comprised of a plurality of images of portions of playing cards, arranged to look like cards dealt to a player, so as to simulate the way at least a plurality of cards look when dealt to a player in a casino, the image of each portion of a playing card includes at opposing parts of the combination cards the same depiction of a card classes used in a standard deck of cards.

15. The deck of cards of claim 14 wherein:

the number combination cards is 47 with the 47 combination cards including all the two card combinations and unique three card combinations in which optimal play depends on the strategy a player uses.

16. The deck of cards of claim 14 further comprising:

three cards containing rules;

one card containing a basic strategy table;

and three cards containing blank strategy tables.

17. The deck of cards of claim 14 wherein:

the back of each combination card simulates the look of a card when dealt to a player.

18. The deck of cards of claim 17 wherein:

the front and back of each combination card are devoid of other information concerning the playing situation depicted by the plurality of images of playing cards on the front of the combination card.

19. The deck of cards of claim 17 wherein:

the front and back of each combination card are devoid of instructional information regarding the playing of the game of blackjack.

20. The deck of cards of claim 14 wherein:

the number of cards is 27 with the 27 combination cards including one combination card for each decision total.

* * * * *